United States Patent
Napolitano et al.

(10) Patent No.: US 8,509,030 B2
(45) Date of Patent: Aug. 13, 2013

(54) UNDERWATER ACOUSTIC POSITIONING SYSTEM

(75) Inventors: Fabien Napolitano, Mareil Marly (FR); Francois Cretollier, Magagnosc (FR)

(73) Assignee: IXBLUE, Marly le Roi (FR)

( * ) Notice: Subject to any disclaimer, the term of this patent is extended or adjusted under 35 U.S.C. 154(b) by 441 days.

(21) Appl. No.: 12/989,247

(22) PCT Filed: Apr. 22, 2009

(86) PCT No.: PCT/FR2009/050749
§ 371 (c)(1),
(2), (4) Date: Oct. 22, 2010

(87) PCT Pub. No.: WO2009/138662
PCT Pub. Date: Nov. 19, 2009

(65) Prior Publication Data
US 2011/0038230 A1    Feb. 17, 2011

(30) Foreign Application Priority Data
Apr. 24, 2008  (FR) ..................... 08 52772

(51) Int. Cl.
*G01S 3/80* (2006.01)
*G01S 5/22* (2006.01)

(52) U.S. Cl.
CPC ..................... *G01S 5/22* (2013.01)
USPC ...................................................... 367/127

(58) Field of Classification Search
USPC ........................................................ 367/127
See application file for complete search history.

(56) References Cited

U.S. PATENT DOCUMENTS

| | | | |
|---|---|---|---|
| 4,070,671 A | 1/1978 | Morrow | |
| 4,187,492 A * | 2/1980 | Delignieres | 367/127 |
| 4,293,857 A * | 10/1981 | Baldwin | 342/32 |
| 4,559,621 A | 12/1985 | Delignieres | |
| 6,256,264 B1 * | 7/2001 | Beckman et al. | 367/130 |
| 6,819,984 B1 * | 11/2004 | Bedckman et al. | 701/21 |
| 2006/0235583 A1 * | 10/2006 | Larsen | 701/21 |
| 2007/0223311 A1 * | 9/2007 | Carof | 367/94 |

FOREIGN PATENT DOCUMENTS

| | | |
|---|---|---|
| FR | 2519424 A | 7/1983 |
| FR | 2627595 A1 | 8/1989 |
| FR | 2722883 A1 | 1/1996 |

OTHER PUBLICATIONS

International Search Report, dated Oct. 23, 2009, from corresponding PCT application.

\* cited by examiner

*Primary Examiner* — Isam Alsomiri
*Assistant Examiner* — James Hulka
(74) *Attorney, Agent, or Firm* — Young & Thompson (57) ABSTRACT

A positioning system has at least one underwater apparatus, which includes an acoustic receiver and a computer. The system includes a base station placed in the sea environment, the base station transmitting an acoustic signal received by the acoustic receiver, wherein the acoustic receiver includes a hydrophone, the base station includes at least two acoustic transmitters forming an antenna, the distances between the acoustic transmitters of the antenna being known and the transmitters being synchronized therebetween. According to the invention, the computer includes an element for calculating differences in arrival time and differences in phases of acoustic signals coming from the base station transmitters, and an element for calculating the possible geometric loci of the position of the apparatus relative to the base station and to the orientation thereof, and the position of the underwater apparatus is predetermined from these possible geometric loci.

16 Claims, 6 Drawing Sheets

UNDERWATER ACOUSTIC POSITIONING SYSTEM

The present invention relates to the field of underwater positioning. More particularly, the invention relates to a system permitting in particular a precise real-time positioning of numerous underwater or surface apparatus simultaneously, and/or necessitating the deployment of only a reduced number of reference base station, and/or permitting acoustic stealth of the apparatus to be positioned.

It is known to use acoustic waves to position an apparatus under the sea. Therefore, in a system of the LBL ("Long Base Line") type, an acoustic transmitter/receiver on board the underwater apparatus to be positioned polls several beacons (at least three), which are distant and independent from each other and the position of which on the seafloor is known. Each of the beacons responds to the poll acoustic signal by a response acoustic signal. The computer of acoustic transmitter/receiver on board the underwater apparatus to be positioned calculates from these received signals the travel times of the acoustic waves between itself and each of the seafloor beacons. From these travel times and the knowledge of the speed of sound in water, the computer calculates the distances between each of the seafloor beacons and the underwater apparatus to be positioned. Then, by triangulation from theses distances and the known positions of the seafloor beacons, the computer calculates the position of the underwater apparatus to be positioned.

In a system of the active LBL type, several beacons (at least three), which are distant and independent from each other and the position of which on the seafloor is known, transmit acoustic signals, on a regular basis and at known time, thanks to the presence of synchronized clocks in each of the transmitters. These acoustic signals are received by an acoustic receiver on board the underwater apparatus to be positioned, which is itself provided with a clock synchronized with the clocks of the seafloor beacons. The computer of the acoustic receiver on board the underwater apparatus to be positioned calculates from the received signals and the data of the on-board clock, the travel times of the acoustic waves between itself and each of the seafloor beacons. From these travel times and the knowledge of the speed of sound in water, the computer calculates the distances between each of the seafloor beacons and the underwater apparatus to be positioned. Then, by triangulation from theses distances and the known positions of the seafloor beacons, the computer calculates the position of the underwater apparatus to be positioned.

In a system of the USBL ("Ultra Short Base Line") type, a system on board a surface ship and comprising an acoustic transmitter and at least two, generally more than four, mechanically-connected acoustic receivers, polls an acoustic transmitter/receiver on board the underwater apparatus to be positioned. The acoustic transmitter/receiver responds by a response acoustic signal. The response acoustic signal is received at each of the receivers of the system on board the surface ship. The computer of the system on board the surface ship estimates from the signals received at each of the receivers the travel time of the acoustic wave between the acoustic transmitter/receiver on board the underwater apparatus to be positioned and the on-board system. From this travel time and the knowledge of the speed of sound in water, the computer calculates the distance between the underwater apparatus to be positioned and the system on board the surface ship. The computer of the system on board the surface ship calculates, from the signals received at each of the receivers, the precise phase differences of the acoustic wave between the acoustic transmitter/receiver on board the underwater apparatus to be positioned and each of the on-board receivers of the system relative to each other. From these phase differences and the previously calculated travel times, the computer calculates the precise travel-time differences of the acoustic wave between the acoustic transmitter/receiver on board the underwater apparatus to be positioned and each of the on-board receivers of the system relative to each other. From these precise travel-time differences, the computer calculates the relative direction between the underwater apparatus to be positioned and the antenna consisting of the receivers on board the surface ship. From the knowledge of the surface ship position and orientation, of the distance and the relative direction between the underwater apparatus to be positioned and the system on board the surface ship, the computer calculates the position of the underwater apparatus to be positioned.

In a system of the reverse USBL type, a system on board the underwater apparatus to be positioned and comprising an acoustic transmitter and at least two, generally more than four, mechanically-connected acoustic receivers, polls an acoustic transmitter/receiver whose position is known. The acoustic transmitter/receiver responds by a response acoustic signal. The response acoustic signal is received at each of the receivers of the system on board the underwater apparatus to be positioned. The computer of the system on board the underwater apparatus to be positioned estimates from the signals received at each of the receivers the travel time of the acoustic wave between the acoustic transmitter/receiver and the system on board the underwater apparatus to be positioned. From this travel time and the knowledge of the speed of sound in water, the computer calculates the distance between the underwater apparatus to be positioned and the acoustic transmitter/receiver. The computer of the system on board the underwater apparatus to be positioned calculates, from the signals received at each of the receivers, the precise phase differences of the acoustic wave between the acoustic transmitter/receiver on board the underwater apparatus to be positioned and each of the on-board receivers of the system relative to each other. From these phase differences and the previously calculated travel times, the computer calculates the precise travel-time differences of the acoustic wave between the acoustic transmitter/receiver on board the underwater apparatus to be positioned and each of the on-board receivers of the system relative to each other. From these precise travel-time differences, the computer calculates the relative direction between the antenna consisting of the four receivers on board the underwater apparatus to be positioned and the acoustic transmitter/receiver. From the knowledge of the transmitter/receiver position, of the orientation in space of the underwater apparatus to be positioned, of the distance and the relative direction between the underwater apparatus to be positioned and the acoustic transmitter/receiver, the computer calculates the position of the underwater apparatus to be positioned.

The USBL, reverse USBL and LBL systems are limited in that they permit the simultaneous positioning of only a limited number of underwater apparatuses in a same area. Indeed, it is necessary, so as to avoid the interferences between the acoustic waves transmitted by the transmitters/receivers on board the underwater apparatuses to be positioned, to share out the usable frequency band among the different transmitters/receivers. The usable frequency bands in underwater acoustics are extremely limited because of the very fast attenuation of the high acoustic frequencies during the propagation in water, which leads to limit the number of transmitters/receivers that can operate simultaneously with each other, and thus the number of underwater apparatuses that can be simultaneously positioned. Now, in the case of the deployment and exploitation of an underwater oil reservoir for example, the number of underwater apparatuses, the position of which has to be permanently known, may be very high and thus widely exceed the capacities of the LBL and USBL systems.

The USBL, reverse USBL and LBL systems does not permit the positioning of an underwater apparatus, the presence of which has to be undetectable by other acoustic apparatuses. Indeed, the use of such systems involves that the underwater apparatus transmits an acoustic signal. This signal may be received by other acoustic apparatuses, which leads to the detection of the underwater apparatus. The impossibility to hide the presence of the underwater apparatus to be positioned may be a redhibitory drawback of the USBL and LBL systems in the case of military applications for example, during a deployment in a hostile area.

The USBL, reverse USBL and LBL systems need a high quantity of energy to be provided to the acoustic transmitter on board each of the apparatuses to be positioned, so as to permit such transmitter to transmit a sufficient acoustic power. Thus, such systems do not permit the use of low-consumption systems on the apparatuses to be positioned.

The LBL systems and active LBL systems need the installation and the precise positioning of several acoustic beacons on the seafloor. The time of deployment of these systems is thus long and expensive.

The USBL and reverse USBL systems need the use of an absolute angular reference means so as to precisely know the orientation of the reception antenna. The absolute angular reference systems having the sufficient performance, for example systems with high-performance inertial components, are expensive and thus significantly increase the cost of the USBL and reverse USBL systems.

The USBL and reverse USBL systems need the use of an acoustic antenna that is a three-dimensional and thus bulky antenna, and that offers a high hydrodynamic resistance, i.e. a planar antenna that makes the acoustic antenna directional.

The LBL, active LBL, USBL and reverse USBL systems have performance of precise positioning that greatly depend on the sound velocity profile in the water column, and that moreover makes necessary to regularly acquire the sound velocity profile, which can change frequently in a same day in the superficial water layers.

Coupled systems are known, that use sub-systems and data merging algorithms and that permit the use of the partial information of position and/or speed and/or acceleration coming from each of the sub-systems and the deduction therefrom, by means of the data merging algorithm, of more precise position information.

For example, the positioning systems are known, that use Kalman filters as data merging algorithm, as in the inertial units, or used jointly with a speed sensor and a gyrocompass, such Kalman filter being capable of fully or partially relock the positioning system by taking into account information of position or distance with respect to a given point, such information being given by a sub-system.

Part of the limitations of the coupled system will be those of the acoustic sub-system of the coupled system, as for example the limitations already mentioned above.

Radio-goniometric systems as the VOR are known, that are used in aeronautic navigation and that use the electromagnetic waves transmitted by a rotating antenna that transmits a signal with two carriers whose phases are offset according to the pointing direction of the antenna with respect to the geographical north, a receiver located on the aerial platform measuring the phase between these two carriers of the electromagnetic signal and permitting as a result to know the angle with the magnetic North, the beacon and the plane—wherein this rotating antenna can be replaced in an equivalent manner by a set of 48 transmission antennas distributed around a circle and synchronously switched.

The radionavigation system LORAN is known, that is used in aeronautics and that measures a time difference between electromagnetic signals transmitted by two synchronized ground stations—wherein at least three stations are used, by pairs, to calculate a position.

The radionavigation system DECCA is known, that is a system formerly used in aeronautics and that used the phase shift between two continuous electromagnetic signals in the form of sinusoids transmitted by two ground stations—wherein at least three stations are used, by pairs, to calculate a position.

Such systems used in aeronautics use waves that are electromagnetic in nature and are thus unusable in sea environment for positioning purpose, because of the very strong attenuation of the electromagnetic waves in sea water for the frequency ranges in which the antenna size remains reasonable. Moreover, the use of an immerged system having rotationally moveable antennas or comprising a great number of antennas is not acceptable for reasons of complexity and cost. Moreover, the use of continuous signals in an immerged system is unacceptable for reasons of energy consumption.

Therefore, a need exists for a system permitting to position in real-time, and in a simultaneous and reliable way, a very great number of underwater or surface apparatuses. A need also exists for a positioning system that does not permit the acoustic detection of the underwater apparatuses to be positioned. A need also exists for a low energy consumption system on apparatuses to be positioned. A need also exists for a positioning system whose deployment time is short. A need also exists for a system whose cost is reduced. A need also exists for a system that uses acoustic signals. A need also exists for an omnidirectional positioning system, which does not constitute a hydrodynamic brake. A need exists for a system whose performance is independent from the variations of sound velocity in the water column.

Therefore, an object of the invention is to solve the above-mentioned problems.

To that end, an object of the invention is a system for positioning at least one underwater apparatus, said underwater apparatus comprising an acoustic receiver comprising a hydrophone, and a computer, said system comprising a base station placed in the sea environment, said base station comprising at least two acoustic transmitters forming an antenna, the distances between the acoustic transmitters of the antenna being known and said transmitters being synchronized to each other, said base station transmits through each of its transmitters an acoustic signal that is received by the acoustic receiver.

According to the invention, the computer comprises means for calculating arrival time differences and phase differences of acoustic signals coming from the base station transmitters, and means for calculating the possible geometric loci of the relative position of the apparatus with respect to said base station and to the orientation thereof, and the position of the underwater apparatus is determined based on these possible geometric loci.

According to an embodiment of the invention, the base station comprises only two transmitters, and the possible geometric locus of the relative position of the apparatus with respect to the base station is, within the uncertainty, a hyperboloid the axis of which is the line containing the two transmitters.

According to another embodiment of the invention, the base station comprises three transmitters in a non-collinear geometric arrangement, and the possible geometric locus of the relative position of the apparatus with respect to the base station is, within the uncertainty, the intersection of two hyperboloids that is considered, at a great relative distance, as being two half-lines.

According to another embodiment of the invention, the base station comprises four transmitters whose positions are not contained in a same plane, and the possible geometric locus of the relative position of the apparatus with respect to the base station is, within the uncertainty, the intersection of three hyperboloids that can be approximated by a point at a small relative distance, or by a half-line at a great distance.

According to an embodiment of the invention, the system comprises means for acquiring the distance separating the apparatus from the base station and permitting to localize the relative position of the system with respect to this base station on a sphere.

According to a particular embodiment of the invention, the absolute position and orientation of the base station antenna are known or estimated by any known means.

According to a particular embodiment of the invention, said means for acquiring the distance separating the apparatus from the base station comprise an acoustic transmitter, the base station comprises an acoustic receiver adapted to said transmitter, and the transmission by the base station is triggered by an acoustic control signal comprising a polling command sent by the apparatus.

According to an embodiment of the invention, the apparatus and the base station each comprise a clock, said clocks being synchronized to each other and permitting the measurement of the acoustic signal travel time between the base station and the apparatus.

According to another particular embodiment of the invention, the clocks can be resynchronized by the transmission of a polling signal transmitted by the underwater apparatus.

According to a particular embodiment of the invention, the relative displacement of the apparatus with respect to the base station between the receptions of two sets of acoustic signals is known or measured, and the computer determines the position of the apparatus by comparing this displacement with couples of possible geometric loci defined at the reception of these two sets of acoustic signals. The first set of signals comprises the acoustic signals received before the displacement, and the second set of signals comprises the acoustic signals received after the displacement.

According to a particular embodiment of the invention, the system comprises at least two base stations not synchronized to each other, and the computer determines the position of the apparatus by the intersection of the different possible geometric loci relative to each of the base stations.

According to an embodiment of the invention, the computer comprises means for taking into account the sound velocity and velocity profile in the sea environment.

BRIEF DESCRIPTION OF THE DRAWINGS

The invention will be better understood and other purposes, details, features and advantages thereof will become more clearly apparent from the description of a particular embodiment of the invention which is given merely by way of illustrative and non-limitative example with reference to the appended drawing, in which.

Figure 1:
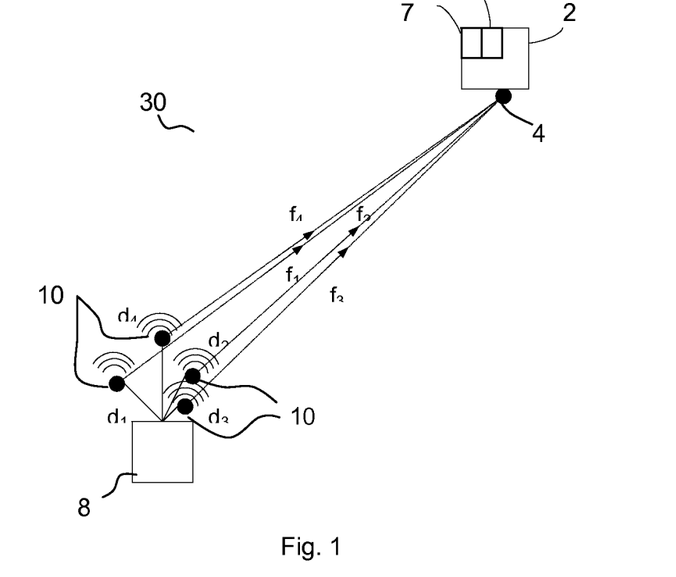
FIG. 1 shows a positioning system according to the invention comprising one base station with four acoustic transmitters and an underwater apparatus to be positioned comprising an acoustic receiver.

FIG. 1 shows a positioning system 30 according to a first embodiment of the present invention. The positioning system 30 comprises acoustic transmission means arranged on at least one base station 8 placed in the sea environment. More precisely, the base station 8 comprises at least two, and preferably, four acoustic transmitters ($d_1$, $d_2$, $d_3$, $d_4$) forming an antenna 11, the distances between the acoustic transmitters ($d_1$, $d_2$, $d_3$, $d_4$) being known and said transmitters ($d_1$, $d_2$, $d_3$, $d_4$) transmitting respectively an acoustic signal ($f_1$, $f_2$, $f_3$, $f_4$) in a synchronous manner. The positioning system 30 according to the invention comprises reception means 3 equipping each of the apparatuses 2 to be positioned, i.e. on each of the users of the positioning system, as well as calculation means 6 and storage means 7.

On the user side, the reception means of the apparatus to be positioned 2 of the positioning system according to the invention comprise at least one acoustic receiver 4 comprising a hydrophone. The acoustic receiver 4 of the system according to the invention is generally connected to an electronics that permits the operation thereof. The acoustic receiver 4 permits in particular to precisely measure the arrival time differences between the acoustic signals ($f_1$, $f_2$, $f_3$, $f_4$) transmitted by the different transmitters ($d_1$, $d_2$, $d_3$, $d_4$) of the base station 8 and also to measure the phase differences of those signals ($f_1$, $f_2$, $f_3$, $f_4$) relative to each other.

According to a particular embodiment of the invention, each of the apparatuses 2 to be positioned comprises its own calculation means 6 and storage means 7. The storage unit 7 stores the value of various variables or parameters as well as instructions of various programs capable of being executed by the calculating unit 6. In the preferred embodiment, among the different memorized programs, a program exists that permits an implementation of the positioning system 30 according to the invention for determining the position of the particular underwater apparatus 2 on which said reception means 3 are installed.

Optionally, the calculation means 6 and the storage means 7 are not on board each of the apparatuses 2 to be positioned and can be offset away. The information coming from each of the acoustic receivers 4 on board the apparatuses 2 to be positioned are transmitted to the computer(s) 6 by any known real-time or differed-time means, as needed.

The transmission means comprise an antenna 11 consisting of a plurality of acoustic transmitters mechanically connected to each other and precisely synchronized. According the preferred embodiment, the antenna 11 comprises four acoustic transmitters ($d_1$, $d_2$, $d_3$, $d_4$) separated by 1 m from each other and not coplanar. The antenna 11 is equipped with the electronics necessary so that each of the transmitters ($d_1$, $d_2$, $d_3$, $d_4$) generates an individual acoustic wave ($f_1$, $f_2$, $f_3$, $f_4$) respectively. The electronics is designed is such a way that the waves transmitted by the different transmitters can be synchronized to within about one hundred nanoseconds.

According to a particular embodiment, the transmission means are fixed to the seafloor. The absolute position of the transmission antenna 11 is known to within 1 m by each of the computers 6 on board the vehicles to be positioned 2. The absolute orientation of the transmission antenna in the space is known to within 0.1 degree by each of the computers 6 on board the vehicles to be positioned 2.

Optionally, the transmission means are fixed to a surface mobile, the position and the orientation of the transmission antenna 11 over time are measured by known means (for example, a GPS positioning system and an inertial system providing the heading, roll and pitch), and then transmitted to the computer(s) by any known means.

The operation of the positioning system 30 whose constituent elements have just been described will now be disclosed in detail.

In the embodiment shown in FIG. 1, the transmitters ($d_1$, $d_2$, $d_3$, $d_4$) of the transmission means each transmit on a periodic basis, for example every 10 seconds, an individual acoustic wave ($f_1$, $f_2$, $f_3$, $f_4$). These four individual waves are simultaneously transmitted, each in a characteristic natural frequency band. For example, the first transmitter $d_1$ transmits a wave $f_1$ in the band 16 kHz-18 kHz, the second transmitter $d_2$ transmits a wave $f_2$ in the band 18 kHz-20 kHz, the third transmitter $d_3$ transmits a wave $f_3$ in the band 20 kHz-22 kHz, the fourth transmitter $d_4$ transmits a wave $f_4$ in the band 22 kHz-24 kHz.

Optionally, waves transmitted by each of the transmitters are identical but time offset by a known offset higher than the duration of the signal transmitted by each transducer. For example, the duration of the signals is 5 ms, the second transmitter transmits 10 ms after the first, the third transmits 10 ms after the second and the fourth transmits 10 ms after the third. The thus prescribed time offsets permit to make the distinction between the waves coming from the different transmitters. Moreover, they are compensated during the position calculation.

Optionally, the waves transmitted by each of the transmitters occupy the same frequency band but are adapted so that they can be differentiated from each other, for example by means of pseudo-orthogonal codes.

The acoustic waves transmitted by each of the individual acoustic transmitters propagate in the sea environment. Therefore, any underwater apparatus present in the useful area can pick up the positioning acoustic waves.

The reception means of a particular underwater apparatus 2 that tries to determine its position is in a sleep state and listens to the sounds propagating in its environment. The waves ($f_1$, $f_2$, $f_3$, $f_4$) received by the receiver 4 in the frequency band of interest are transformed into a signal depending on the time, which can then be processed by the electronics of the reception means.

The first step of the signal processing consists in detecting the difference between the arrival times of the signals respectively transmitted by the transmitters of the transmission means, taken by pairs, and to attribute to each pair of transmitters a corresponding arrival time difference. This is made possible by the fact that these waves have been produced in such a way that they can be differentiated from each other.

The second step of the electric signal processing consists in measuring the phase differences, at the time of their arrival on the acoustic sensor, between the signals respectively transmitted by each pair of transmitters of the transmission means.

The arrival time differences and the arrival phase differences of the signals transmitted by each pair of transmitters of the transmission means and received by the reception means are then transmitted to the calculation means 6.

The first step of calculation consists in calculating, from the arrival time differences and the arrival phase differences, the precise time differences of the signals transmitted for each pair of transmitters ($d_i$, $d_j$) of the transmission means and received by the reception means.

Optionally, and for example in the case in which the different transmitters are separated from each other by less that half the wavelength, the computer calculates the precise time differences of the signals transmitted by each of the transmitters of the transmission means and received by the reception means using only the phase differences.

The second step of calculation consists in calculating, from the precise time differences of the signals transmitted by each of the transmitters of the transmission means and received by the reception means, the possible geometric loci 14 of the relative position of the acoustic receiver 4 on board the apparatus to be positioned 2 with respect to the antenna 11 of the base station 8.

According to a particular embodiment, the calculation of the relative position of the acoustic receiver 4 on board the apparatus to be positioned 2 with respect to the antenna 11 of the base station 8 is approached, in an orientated coordinate system associated to the antenna of the transmission means, by a half-line coming from the antenna of the transmission means and containing the position of the receiver on board the apparatus to be positioned.

According to a particular embodiment, the transmission means comprise two transmitters 10 forming an antenna 11. In this case, the second step of calculation permits to obtain partial information about the relative position of the apparatus to be positioned 2 with respect to the antenna 11 of the base station 8. For example, if the antenna 11 comprises two transmitters ($d_1$, $d_2$), the calculations permits, based on the precise time differences of the signals transmitted by each of the transmitters ($d_1$, $d_2$) of the transmission means 9 and received by the reception means 3 to determine, in an oriented coordinate system associated to the antenna 11 of the transmission means, the possible geometric locus 14 of the position of the receiver 4 on board the vehicle to be positioned 2 as being a hyperboloid in the space. Such hyperboloid is defined by the position of the transmitters and by the measurement of the arrival time difference and the arrival phase difference of the acoustic signals coming from the two transmitters ($d_1$, $d_2$). More precisely, the axis of this hyperboloid is an axis passing by the positions of the two transmitters ($d_1$, $d_2$), those transmitters corresponding to the hyperboloid foci. The sign of the precise arrival time difference between the two acoustic signals received permits to identify the surface of the hyperboloid on which is located the receiver of the apparatus to be positioned, and to eliminate the other surface of the hyperboloid.

According to another particular embodiment, the transmission means comprise three transmitters 10 in a non-colinear geometric arrangement, forming an antenna 11. By proceeding in the same way as above, the second step of calculation permits to obtain more precise information about the relative position of the receiver on board the underwater apparatus with respect to the antenna of the transmission means. For example, if the antenna 11 comprises three transmitters ($d_1$, $d_2$, $d_3$), the calculation permits, based on the arrival time differences and the arrival phase differences of the signals transmitted by the pairs of transmitters ($d_1$, $d_2$) and ($d_1$, $d_3$) of the transmission means 9 and received by the acoustic receiver 4, to determine, in an oriented coordinate system associated to the antenna of the transmission means, the possible geometric locus 14 of the position of the receiver 4 on board the vehicle to be positioned 2 as being the intersection between two hyperboloids corresponding to a pair of transmitters ($d_1$, $d_2$) and ($d_1$, $d_3$) respectively. Each hyperboloid is defined by the position of the transmitters and by the measurement of the precise arrival time difference of the acoustic signals between these two transmitters. The possible geometric locus of relative position of the receiver 4 with respect of the base station 8 is then located at the intersection of the two hyperboloids. When the relative distance between the apparatus to be positioned 2 and the antenna 11 of the transmission means 9 is great, the intersection between the two hyperboloids can be approximated by two half-lines.

Figure 2:
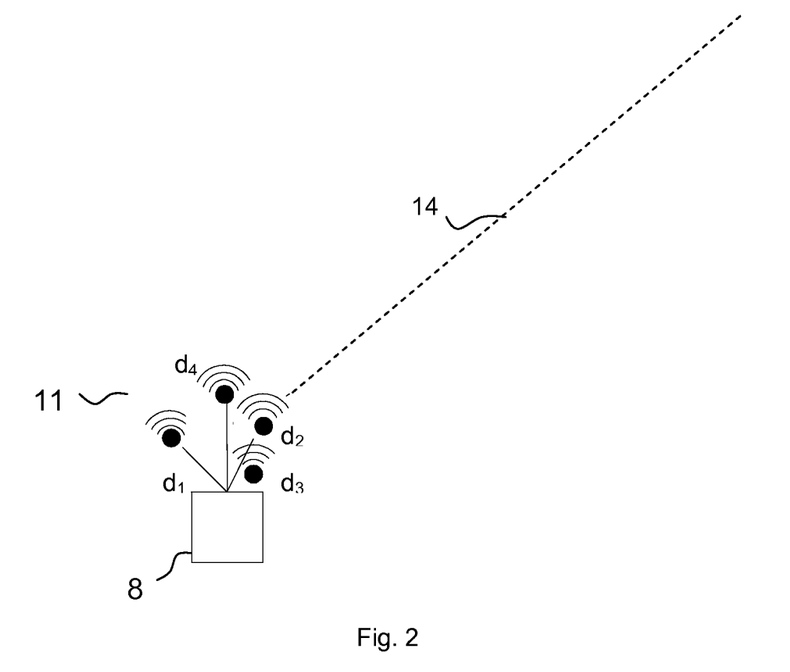
FIG. 2 shows the possible geometric locus (a half-line) of the position of the apparatus, determined by the positioning system of FIG. 1.

FIG. 2 shows a preferred embodiment, in which the transmission means 9 comprise four transmitters 10 whose geometrical positions are not contained is a same plane and forming an antenna 11. By proceeding in the same way as above, the second step of calculation permits to obtain information permitting to obtain informations enabling, within the uncertainty, to define the relative position of the antenna off the transmission means and the receiver on board the underwater vehicle. For example, if the antenna 11 comprises four transmitters ($d_1$, $d_2$, $d_3$, $d_4$), the calculation permits, based on the precise time differences of the signals respectively transmitted by the different pairs of transmitters of the transmission means 9 and received by the reception means 3, to determine, in an oriented coordinate system associated to the antenna of the transmission means, the possible geometric locus 14 of the position of the receiver 4 on board the vehicle to be positioned 2 as being the intersection of hyperboloids, for example three hyperboloids corresponding to the pairs of transmitters ($d_1$, $d_2$), ($d_1$, $d_3$) and ($d_1$, $d_4$) respectively. Each hyperboloid is defined by the position of the transmitters and by the measurement of the precise arrival time difference of the acoustic signals between these two transmitters. The possible geometric locus of relative position of the receiver 4 with respect to the base station 8 is then located at the intersection of these hyperboloids. When the relative distance between the apparatus to be positioned 2 and the antenna 11 of the transmission means 9 is small, the intersection between these hyperboloids can be approximated by a point. When the relative distance between the apparatus to be positioned 2 and the antenna 11 of the transmission means 9 is great, the intersection between these hyperboloids can be approximated by a half-line.

According to a particular embodiment, the system of the invention comprises means for calculating, based on the relative direction between the antenna of the transmission means and the receiver on board the underwater vehicle, and based on the orientation, in a reference oriented coordinate system, of the antenna of the transmission means, the absolute direction, in a reference oriented coordinate system, between the antenna of the transmission means and the receiver on board the underwater vehicle.

Optionally, the transmission means 9 and the reception means 3 are provided with synchronized clocks. The clock of the transmission means 9 is used to trigger the transmission of the acoustic signals, and the clock of the reception means 3 being synchronized with the transmission clock, the propagation time of the acoustic wave between each transmitter 10 of the transmission antenna and the receiver 4 on board the vehicle to be positioned 2 can be estimated by the difference between the reception time and the known transmission time. For example, in standard conditions, a synchronization to within 1 ms permits to obtain a distance error smaller than 1.5 m. Based on this propagation time, using the velocity of propagation (or speed) of sound in water, the distance separating the antenna of the transmission means from the receiver of the reception means can be deduced.

Figure 3:
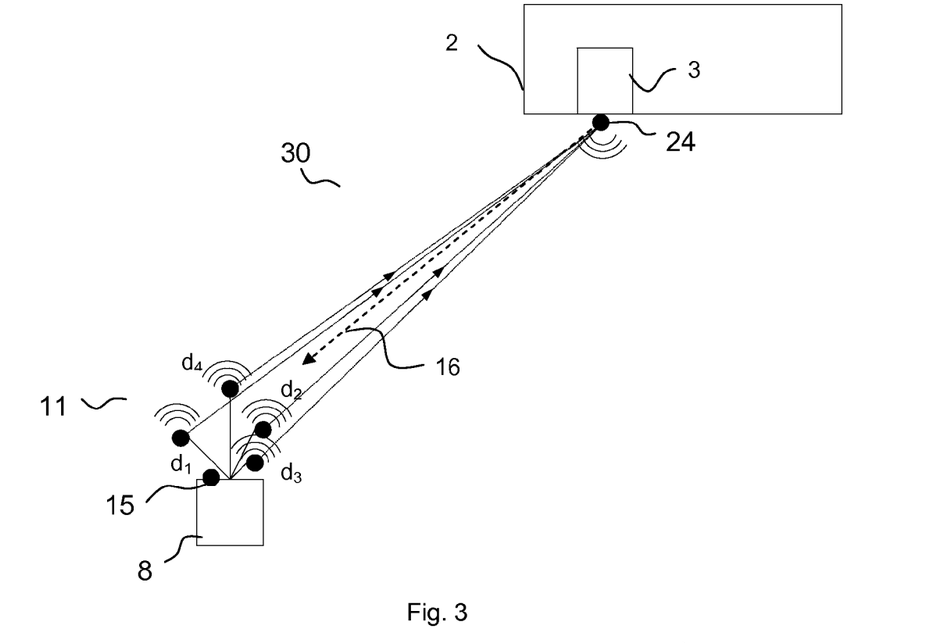
FIG. 3 shows a positioning system comprising one base station with four acoustic transmitters and an apparatus to be positioned comprising a transmitter capable of polling the base station.

According to an embodiment shown in FIG. 3, the transmission means 9 are completed by an acoustic receiver 15 and the reception means 3 by an acoustic transmitter 24. The transmission means 9 do not transmit in an autonomous manner but in response to a command acoustic signal 16 transmitted by the transmitter 24 on board the vehicle to be positioned 2. Based on the time separating the transmission of the command 16 from the reception of the response signal, the propagation time of the acoustic wave between a transmitter 24 on board the underwater apparatus to be positioned and a receiver 15 fixed to the base station 8 can be deduced. Based on this propagation time, using the velocity of propagation of sound in water, the distance separating the antenna 11 of the transmission means from the receiver 4 of the reception means can be deduced.

Figure 4:
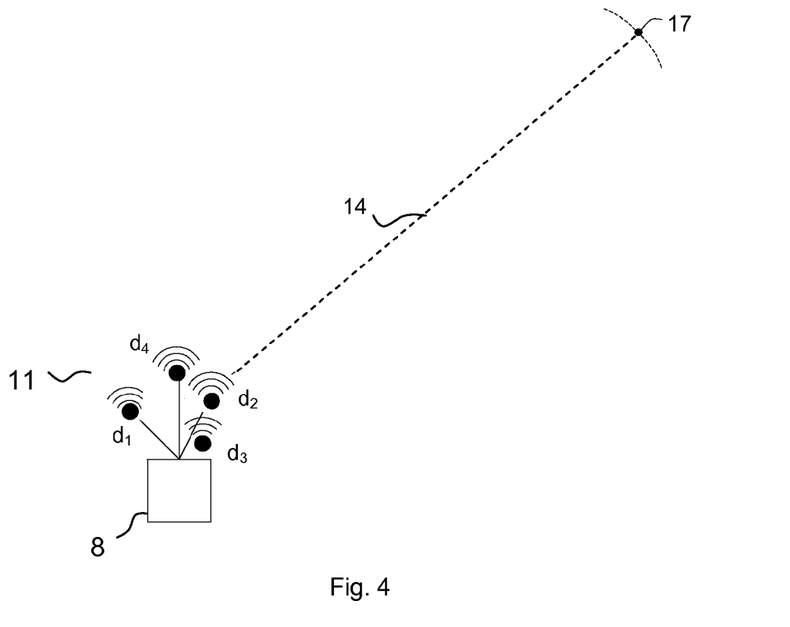
FIG. 4 shows the possible geometric locus (indicated by a point) of the position of the apparatus determined by a positioning system of FIG. 1-3, in which the distance between the apparatus and the base station is known or measured.

FIG. 4 illustrates the determination of the position 17 with respect to the apparatus to be positioned with respect to a base station 8 at the intersection of a half-line 14 and a sphere the radius of which is equal to the distance measured between the base station 8 and the apparatus.

According to a particular embodiment, the positioning system has means for knowing the immersion depth difference between the positioning system and the base station, for example by knowing the immersion depth of the beacon and the immersion depth of the positioning system by means of an immersion sensor, or by knowing the altitude of the beacon and the altitude of the positioning system by means of an altimeter, in the case where the variation of the seafloor topography is known. For a positioning system at a different immersion depth than that of the base station, this knowledge of the immersion depth difference permits to locate the possible geometric locus 14 in a horizontal plane. A base station with three transmitters in a horizontal plane or four transmitters permit to position the apparatus insofar as the possible geometric locus 14 is the intersection of a non-horizontal half-line with a plane, i.e. a point.

The position 17 of the underwater apparatus established in the above-described steps of calculation is a relative position of the underwater apparatus 2 with respect to an oriented coordinate system associated to the antenna 11 of the transmission means 9. If it is desired to calculate the position of the receiver 4 on board the underwater apparatus to be positioned with respect to a reference oriented coordinate system, it is necessary to precisely know the position and orientation of the antenna 11 of the transmission means 9 with respect to this reference oriented coordinate system. In the case where this antenna 11 is fixed, as proposed in a particular embodiment, it is possible to precisely estimate those values by a previous calibration. A simple method for performing this calibration consists in implementing the system using an underwater apparatus whose position is precisely known. For example, this apparatus can be fixed at the end of a pole on the side of a ship and can be positioned by means of a GPS system. Based on the received acoustic measures and using calculation steps similar to the steps described in the proposed embodiment, it is easy to find, for example by the least squares method, the value of the parameters of position and orientation of the transmission means permitting to obtain the lesser error possible about the position of the apparatus. These parameters can then be taken into account as input data for the positioning system, given that, by hypothesis, the position and orientation of the transmission means are fixed.

According to a particular embodiment, the system of the invention comprises means for measuring the relative displacement of the apparatus 2 with respect to the base station 8 between the receptions of two sets of acoustic signals. The computer 6 determines the position 17 of the apparatus 2 by comparing this displacement with the couples of possible geometric loci at the reception of these acoustic signals.

Figure 5:
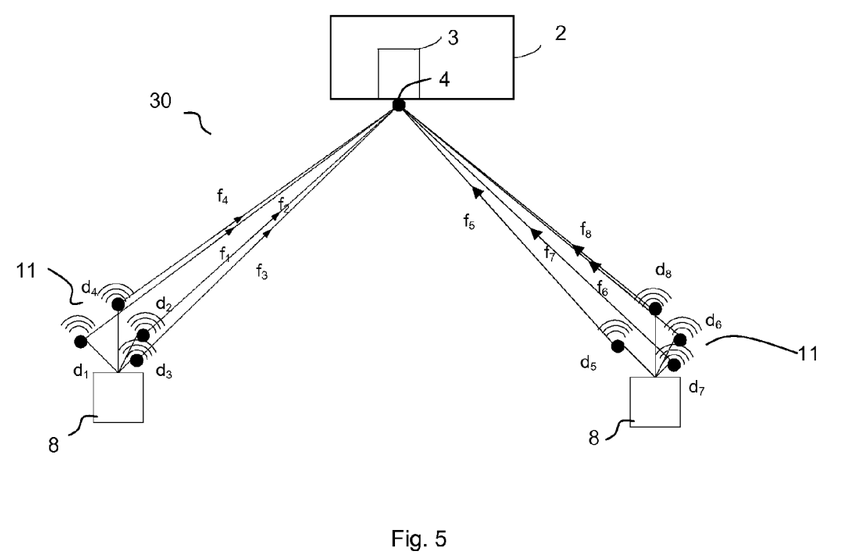
FIG. 5 shows a positioning system comprising two multi-transmitter base stations, not synchronized to each other, and an apparatus to be positioned, located within the range of the two base stations.
Figure 6:
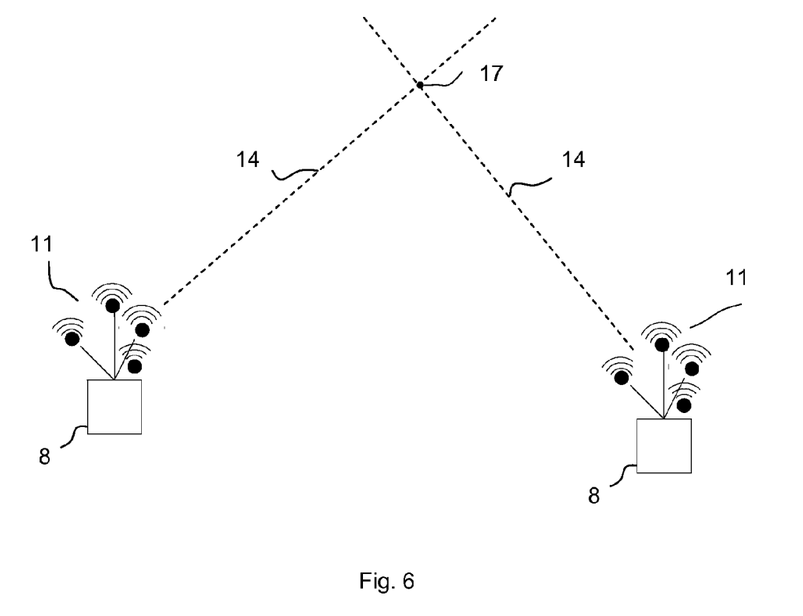
FIG. 6 shows the possible geometric locus (indicated by a point) of the position of the apparatus determined by a positioning system of FIG. 5.

According to a particular embodiment, shown in FIGS. 5 and 6, the system of the invention comprises at least two base station 8 not synchronized to each other. The computer 6 determines the position 17 of the apparatus 2 by the intersection of the different possible geometric loci 14 relative to each of the base stations 8. For base stations with four transmitters, the position of the apparatus is determined as being the intersection of two half-lines.

Figure 7:
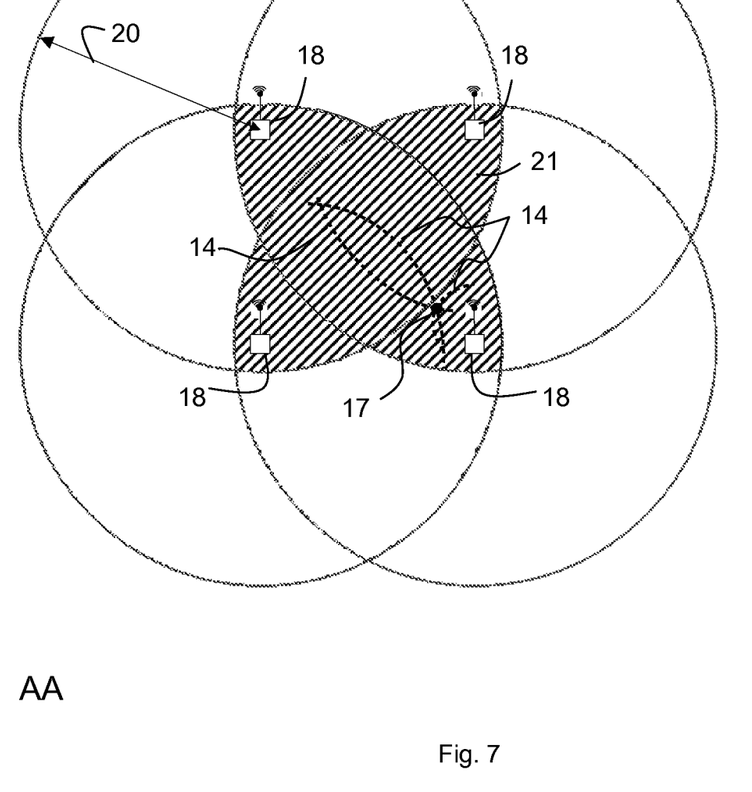
FIG. 7 shows the coverage surface of a conventional positioning system of the LBL type, comprising four base stations each comprising a transmitter.
Figure 9:
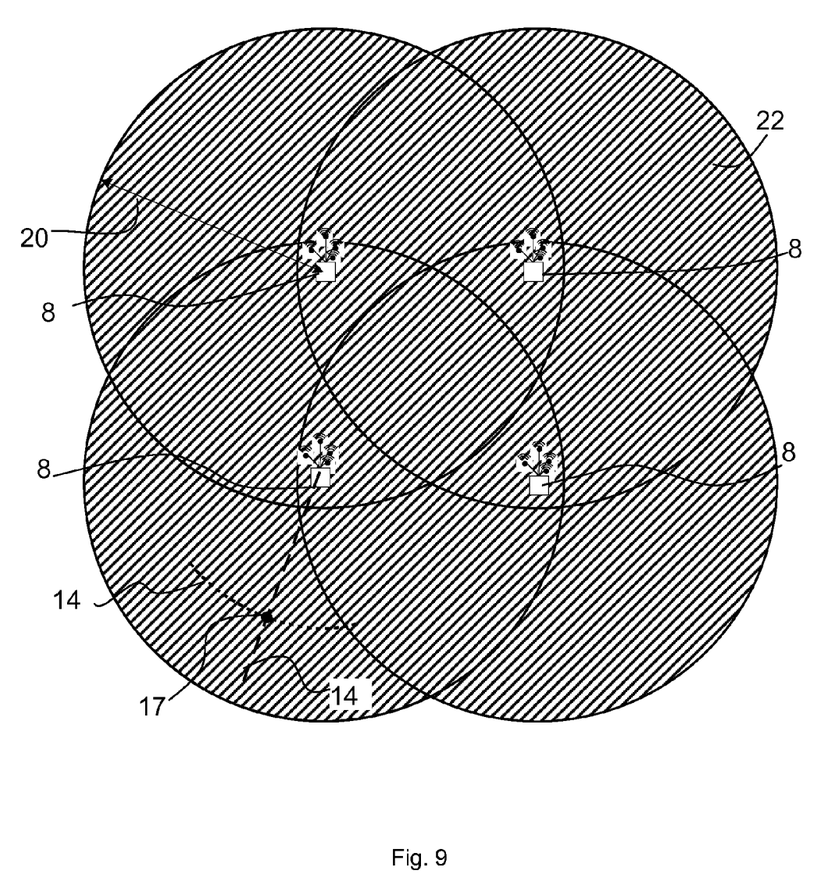
FIG. 9 shows the coverage surface of a positioning system according to the invention comprising four base stations each having four transmitters, in which the distance from the apparatus to a base is known or measured.

FIG. 7 shows the coverage surface 21 (hatched area) of a positioning system of the LBL type according to the state of the art. This positioning system comprises four base stations 18, each comprising a transmitter. The system conventionally permits to determine the position 17 of an apparatus located inside a volume located within the range of at least three single-transmitter base stations 18, the range of each transmitter being defined by the volume of a sphere whose radius 20 is equal to the maximal range of the transmitter. The projection in a plane of the volume at the intersection of three spheres is shown in FIG. 9 by a hatched area 21 corresponding to the intersection of the range circles of at least three beacons. This coverage surface 21 is significantly smaller than the range 20 of each of the transmitters.

Figure 8:
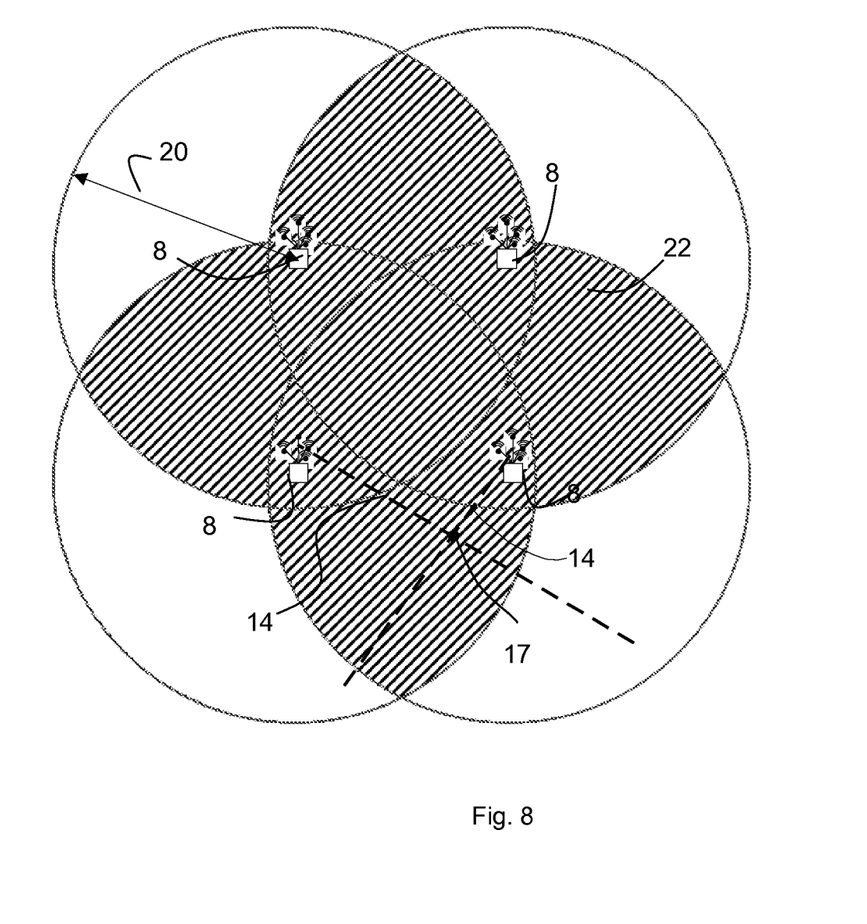
FIG. 8 shows the coverage surface of a positioning system according to the invention comprising four base stations each having four transmitters, and using the crossing of the half-lines.

FIG. 8 shows the coverage surface 22 of a positioning system according to an embodiment of the invention. The positioning system 30 comprises four base stations 8, each comprising four transmitters. The system permits to determine the position 17 of an apparatus with respect to the relative geometric loci of the two closest multi-transmitter base stations 8. The coverage surface 22 (hatched area) delimited by the intersection of at least two circles corresponding to the maximal range of two beacons is significantly increased compared to that of FIG. 7. Moreover, this positioning system permits the simultaneous positioning of a very great number of underwater or surface apparatuses, and permits the acoustic stealth thereof insofar as it is not possible to a third party to detect these underwater apparatuses to be positioned, because these latter do not transmit any acoustic signal.

FIG. 9 shows the coverage surface 22 of a positioning system according to another embodiment of the invention. The positioning system 30 comprises four base stations 8, each comprising four transmitters, and comprises a means for knowing the distance between the apparatus to be positioned and a base station 8. The system permits to determine the position 17 of an apparatus by the intersection of the distance sphere and the possible geometric locus relative to at least one multi-transmitter base station 8. The coverage surface 22 (hatched area) delimited in FIG. 9 is still significantly increased and fully covers the maximal range of the transmitters of the base stations 8.

Thus, the positioning system of the invention permits a great number of users provided with acoustic detection means and calculation means to position themselves with respect to only one transmitting antenna.

It also obviously appears that the users that do not transmit acoustic signal can not be easily detected by acoustic means. The positioning system of the invention makes it possible to determine stealthily the position of an underwater apparatus provided with acoustic reception means.

The system is easy to deploy because it necessitates at the minimum that the installation of only one base station on the seafloor and not a plurality of bases as the prior systems.

The cost of the reception means placed on the underwater apparatus to be positioned is limited because they comprise only simple components that are usual on the market.

Moreover, the reception means consume little energy and are of small size because they do not operate in transmission and thus do not need the generation of a significant electric power to transmit an acoustic wave.

The cost of the transmission means placed on the transmission antenna is limited because they comprise only simple components that are usual on the market and, in particular, because it is not necessary to have in real time a precise heading, roll and pitch reference.

The precision of the positioning system according to the invention is essentially given by the size of the transmitting antenna for a given operation frequency band. For example, with an antenna of 1 m wide operating around 20 kHz, a positioning precision of the order of one meter can be obtained at a distance of 1 km, with a range of about 4 km.

The positioning system of the invention does no require the use of the transmitting beacons on the underwater apparatuses to be positioned. The invention makes it possible to use of a fixed and reduced number of acoustic transmitters, whatever the number of underwater or surface apparatuses to be positioned. The invention thus makes it possible to position an arbitrary number of underwater apparatuses over a same area.

The invention thus permits to position underwater apparatuses, the presence of which has to be undetectable by other acoustic apparatuses.

As the underwater apparatuses to be positioned do not necessarily use transmitting beacons, the invention makes it possible to reduce the electrical consumption of each underwater apparatus to be positioned.

Advantageously, because it does not necessarily need the deployment of several reference systems, but only one, the invention permits a fast deployment of the positioning system.

Advantageously, because it is not necessary to know in real time the orientation in space of the underwater or surface apparatus to be positioned, the invention makes it possible to reduce the use of complex orientation-measurement systems, and thus the invention makes it possible to position an underwater apparatus for a low cost.

Advantageously, by deploying a network of reference systems so as to cover a large area in an embodiment where the distance between the apparatus and a given reference station is measured or estimated, because it is then not necessary that each point of the area is covered by several reference systems but by only one, the invention makes it possible to cover a very large area with a very reduced number of reference stations, which significantly reduces the deployment work and the duration thereof, and also significantly reduces the costs.

Advantageously, because it permits the receiver to position itself without transmitting while being in the visibility range of only two stations by crossing of two half-lines, the invention makes it possible to deploy only a minimum of two stations for a stealthy, multi-user positioning system, or to increase the covered area by beneficially using all the areas covered by the two reference stations.

Advantageously, because it permits the receiver to position itself while being in the visibility range of two stations by crossing of two half-lines, the invention makes it possible to avoid the need of synchronizing the different bases to each other.

Advantageously, because it permits the receiver to position itself by crossing of two half-lines, the projection of which in a local horizontal plane defining the longitude and latitude is independent of the variations of the sound velocity in the water column, the invention makes possible not to depend on the variations of the sound velocity—those variations being particularly significant and changeable near the surface, and thus avoids the user having to regularly acquire the profile of sound velocity.

Advantageously, because it permits the receiver to position itself while being in the visibility range of only one base station by crossing of a half-line with a sphere when the distance to the station can be estimated or measured, the invention makes it possible to cover a very large area with a very reduced number of stations to be deployed, by beneficially using any area covered even by only one reference station.

Advantageously, because it makes it possible to have only one receiver on the apparatus to be positioned, the invention offers a low-cost omnidirectional positioning system with a low or null impact on the apparatus hydrodynamics.

While the invention has been described with reference to a particular embodiment, it is in no way limited to this embodiment. It comprises all the technical equivalents of the described means as well as their combinations within the scope of the invention.

The invention claimed is:

1. A positioning system (30) of at least one underwater apparatus (2), said underwater apparatus (2) comprising:
   an acoustic receiver (4) comprising a hydrophone, and
   a computer (6),
   said system comprising :
   a base station (8) placed in the sea environment, comprising at least two acoustic transmitters (10) forming an antenna (11), wherein the distances between the acoustic transmitters (10) of the antenna (11) are known and said transmitters are synchronized to each other,
   wherein said base station transmits through each of its transmitters (10) an acoustic signal that is received by the acoustic receiver (4), wherein,
   the acoustic receiver (4) comprises signal processing means for detecting the difference between the arrival times of the signals respectively transmitted by the transmitters (10), taken by pairs, and to attribute to each pair of transmitters (10) a corresponding arrival time difference; and said signal processing means being adapted for measuring the phase differences, at the time of their arrival on the acoustic receiver (4), between the signals respectively transmitted by each pair of transmitters (10), and
   the computer (6) comprises means configured for calculating, from the arrival time differences and phase differences of acoustic signals coming from the transmitters of the base station (8), the precise time differences of the signals transmitted for each pair of transmitters (10) and received by the acoustic receiver (4) and means for calculating, from the precise time differences of the signals transmitted by each of the transmitters (10) and received by the acoustic receiver (4), the possible geometric loci (14) of the relative position of the apparatus (2) with respect to said base station (8) and to the orientation thereof, and the position (17) of the underwater apparatus is determined based on these possible geometric loci (14).

2. The system according to claim 1, characterized in that the base station (8) comprises only two transmitters (10), wherein the possible geometric locus (14) of the relative position of the apparatus with respect to the base station is, within the uncertainty, a hyperboloid the axis of which is the line containing the two transmitters (10).

3. The system according to claim 2, characterized in that the system comprises means for acquiring the distance separating the apparatus (2) from the base station (8) and permitting to localize the relative position of the system with respect to this base station (8) on a sphere.

4. The system according to claim 1, characterized in that the base station (8) comprises three transmitters (10) in a non-colinear geometric arrangement, wherein the possible geometric locus (14) of the relative position of the apparatus (2) with respect to the base station (8) is, within the uncertainty, the intersection of two hyperboloids that is considered, at a great relative distance, as being two half-lines.

5. The system according to claim 4, characterized in that the system comprises means for acquiring the distance separating the apparatus (2) from the base station (8) and permitting to localize the relative position of the system with respect to this base station (8) on a sphere.

6. The system according to claim 1, characterized in that the base station (8) comprises four transmitters (10) whose positions are not contained in a same plane, wherein the possible geometric locus (14) of the relative position of the apparatus (2) with respect to the base station (8) is, within the uncertainty, the intersection of three hyperboloids that can be approximated by a point at a small relative distance, or by a half-line at a great distance.

7. The system according to claim 6, characterized in that the system comprises means for acquiring the distance separating the apparatus (2) from the base station (8) and permitting to localize the relative position of the system with respect to this base station (8) on a sphere.

8. The system according to claim 1, characterized in that the system comprises means for acquiring the distance separating the apparatus (2) from the base station (8) and permitting to localize the relative position of the system with respect to this base station (8) on a sphere.

9. The system according to claim 8, characterized in that the absolute position and orientation of the antenna (11) of the base station (8) are known or estimated by any known means.

10. The system according to claim 9, characterized in that the means for acquiring the distance separating the apparatus (2) from the base station (8) comprise an acoustic transmitter (24), and in that the base station comprises an acoustic receiver (15) adapted to said transmitter, wherein the transmission by the base station (8) is triggered by an acoustic control signal comprising a polling command sent by the apparatus (2).

11. The system according to claim 8, characterized in that the means for acquiring the distance separating the apparatus (2) from the base station (8) comprise an acoustic transmitter (24), and in that the base station comprises an acoustic receiver (15) adapted to said transmitter, wherein the transmission by the base station (8) is triggered by an acoustic control signal comprising a polling command sent by the apparatus (2).

12. The system according to claim 1, characterized in that the apparatus (2) and the base station (8) each comprise a clock, said clocks being synchronized to each other and permitting the measurement of the acoustic signal travel time between the base station (8) and the apparatus (2).

13. The system according to claim 12, characterized in that the clocks can be resynchronized by the transmission of a polling signal transmitted by the underwater apparatus (2).

14. The system according to claim 1, characterized in that the relative displacement of the apparatus (2) with respect to the base station (8) between the receptions of two sets of acoustic signals is known or measured, and in that the computer determines the position of the apparatus by comparing this displacement with couples of possible geometric loci (14) defined at the reception of these two sets of acoustic signals.

15. The system according to claim 1, characterized in that it comprises at least two base stations (8) not synchronized to each other, and in that the computer determines the position (17) of the apparatus (2) by the intersection of the different possible geometric loci (14) relative to each of the base stations (8).

16. The system according to claim 1, characterized in that the computer comprises means for taking into account the sound velocity and velocity profile in the sea environment.

* * * * *